United States Patent
L'Heureux et al.

(10) Patent No.: US 9,288,261 B2
(45) Date of Patent: *Mar. 15, 2016

(54) NETWORK RESOURCE MODIFICATION FOR HIGHER NETWORK CONNECTION CONCURRENCE

(71) Applicants: Israel L'Heureux, Monaco (MC); Mark D. Alleman, Portland, OR (US)

(72) Inventors: Israel L'Heureux, Monaco (MC); Mark D. Alleman, Portland, OR (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/145,059

(22) Filed: Dec. 31, 2013

(65) Prior Publication Data

US 2014/0258379 A1    Sep. 11, 2014

Related U.S. Application Data

(63) Continuation of application No. 13/004,894, filed on Jan. 12, 2011, now Pat. No. 8,620,999.

(51) Int. Cl.
*G06F 15/16* (2006.01)
*H04L 29/08* (2006.01)

(52) U.S. Cl.
CPC ............ *H04L 67/10* (2013.01); *H04L 67/2842* (2013.01); *H04L 67/1002* (2013.01)

(58) Field of Classification Search
None
See application file for complete search history.

(56) References Cited

U.S. PATENT DOCUMENTS

| | | | |
|---|---|---|---|
| 2005/0165931 A1* | 7/2005 | Shur | H04L 29/06 709/226 |
| 2006/0059246 A1* | 3/2006 | Grove | H04L 67/2804 709/219 |
| 2006/0064500 A1* | 3/2006 | Roth | H04L 29/06027 709/231 |
| 2006/0218304 A1* | 9/2006 | Mukherjee | G06F 17/30902 709/246 |

* cited by examiner

*Primary Examiner* — Brendan Higa
*Assistant Examiner* — Padma Mundur
(74) *Attorney, Agent, or Firm* — Michael J. Andri (57) ABSTRACT

Implementations for network resource modification for enabling higher network connection concurrence are disclosed. An example method includes receiving a request from a client for a network resource having references to objects, and retrieving the network resource from one or more servers. The method further includes modifying the network resource to cause the client to open a greater number of concurrent TCP connections to the network appliance than otherwise would have been opened had the network resource not been modified due to a browser program imposed limit on a number of concurrent TCP connections. The method further includes sending the modified network resource to the client, receiving a plurality requests for the objects from the client over the greater number of concurrent TCP connections, and replying to the plurality of requests for the objects by sending the objects to the client over the greater number of concurrent TCP connections.

20 Claims, 9 Drawing Sheets

```
<!DOCTYPE HTML PUBLIC "-//W3C//DTD HTML 4.01
Transitional//EN""http://www.w3.org/TR/html4/loose.dtd"><html lang="en"><head><title>ExampleUrl.com International News</title>

<link rel="stylesheet" type="text/css" href="http://i.cdn.example.com/ExampleUrl/.element/css/3.0/common.css">     ◄── 510
<link rel="stylesheet" type="text/css" href="http://i.cdn.example.com/ExampleUrl/.element/css/3.0/main.css">      ◄── 512
<link rel="stylesheet" type="text/css" href="http://i.cdn.example.com/ExampleUrl/.element/css/3.0/connect/overlay.css?20100421">
<style type="text/css">
* html #hdr-auth,
* html #pmUserPanel                                                                  514
{display:none}
.ExampleUrl_shdcamtt1 .ExampleUrl_mtlplnode { height:124px; }
</style>
<link rel="stylesheet" type="text/css" href="http://i.cdn.example.com/ExampleUrl/.element/css/3.0/personalization.css?20100421">

<meta name="fb_app_id" content="80401312489"/>
<meta property="fb:page_id" content="129343697106537"/>                              516

<script language="JavaScript" type="text/javascript">var ExampleUrlCurrTime =
new Date(1292406984232); var ExampleUrlCurrHour = 4; var ExampleUrlCurrMin = 56; var ExampleUrlCurrDay='Wed';</script>
<script src="http://i.cdn.example.com/ExampleUrl/.element/js/3.0/omni.time.js" type="text/javascript"></script>  ◄── 518

<link rel="stylesheet" type="text/css" href="http://i.cdn.example.com/ExampleUrl/.element/css/3.0/main.css">  ◄── 520

<script src="http://i.cdn.example.com/ExampleUrl/.element/js/3.0/main.js" type="text/javascript"></script>  ◄── 522
<script src="http://i.cdn.example.com/ExampleUrl/.element/js/3.0/swfobject-2.2.js" type="text/javascript"></script>  ◄── 524

<script src="http://i.cdn.example.com/ExampleUrl/.element/js/3.0/csiManager.js" type="text/javascript"></script>  ◄── 526
<script src="http://i.cdn.example.com/ExampleUrl/.element/js/3.0/StorageManager.js?20100728" type="text/javascript"></script>
<script type="text/javascript" src="http://i.cdn.example.com/ExampleUrl/.element/js/3.0/connect/connect-lite.js"></script>

<script src="/.element/js/3.0/local.js?20101109" type="text/javascript"></script>              528
                                                                                          530

<script src="http://i.cdn.example.com/ExampleUrl/.element/js/3.0/video/cvp_suppl.js" type="text/javascript"></script>  ◄── 532
<script src="http://i.cdn.example.com/ExampleUrl/.element/js/3.0/video/cvp.js" type="text/javascript"></script>  ◄── 534
<script src="http://i.cdn.example.com/xslo/cvp/ads/freewheel/js/fwjslib_1.1.js?version=1.1" type="text/javascript"></script>

536
<script type="text/javascript">
        var ExampleUrlCVPAdSection = 'edition.ExampleUrl.com_main_homepage';
</script>
<script type="text/javascript">
   var ExampleUrlIsSectionPage = true;
</script>

<script type="text/javascript" src="http://i.cdn.example.com/ExampleUrl/.element/js/2.0/ad_head0.js"></script>  ◄── 538
<script type="text/javascript" src="http://i.cdn.example.com/ExampleUrl/ExampleUrl_adspaces/ExampleUrl_adspaces.js"></script>
</head><body id="ExampleUrlMainPage">   <div id="ExampleUrl_ipadappbanner"></div>
<script>
<style>                                                                                  540
```

FIG. 5

```html
<!DOCTYPE HTML PUBLIC "-//W3C//DTD HTML 4.01
Transitional//EN""http://www.w3.org/TR/html4/loose.dtd"><html lang="en"><head><title>ExampleUrl.com International News</title>

<link rel="stylesheet" type="text/css" href="http://i.cdn.example.com/ExampleUrl/.element/css/3.0/common.css">   ← 610
<link rel="stylesheet" type="text/css" href="http://i.cdn.example.com/ExampleUrl/.element/css/3.0/main.css">   ← 612
<link rel="stylesheet" type="text/css"
href="http://i.cdn.example.com/ExampleUrl/.element/css/3.0/connect/overlay.css?20100421">   ← 614
<style type="text/css">
* html #hdr-auth,
* html #pmUserPanel
{display:none}
.ExampleUrl_shdcamtt1 .ExampleUrl_mtlplnode { height:124px; }
</style>
<link rel="stylesheet" type="text/css"
href="http://i.cdn.example.com/ExampleUrl/.element/css/3.0/personalization.css?20100421">   ← 616

<meta name="fb_app_id" content="80401312489"/>
<meta property="fb:page_id" content="129343697106537"/>

<script language="JavaScript" type="text/javascript">var ExampleUrlCurrTime =
new Date(1292406984232); var ExampleUrlCurrHour = 4; var ExampleUrlCurrMin = 56; var ExampleUrlCurrDay='Wed';</script>
<script src="http://i.cdn.example.com/ExampleUrl/.element/js/3.0/omni.time.js" type="text/javascript"></script>   ← 618

<link rel="stylesheet" type="text/css" href="http://216.100.224.98/ExampleUrl/.element/css/3.0/main.css">   ← 620

<script src="http://i.cdn.example.com:8080/ExampleUrl/.element/js/3.0/main.js" type="text/javascript"></script>   ← 622
<script src="http://i.cdn.example.com/ExampleUrl/.element/js/3.0/swfobject-2.2.js" type="text/javascript"></script>   ← 624

<script src="http://i.cdn.example.com:8080/ExampleUrl/.element/js/3.0/csiManager.js" type="text/javascript"></script>   ← 626
<script src="http://i.cdn.example.com:8080/ExampleUrl/.element/js/3.0/StorageManager.js?20100728" type="text/javascript"></script>
<script type="text/javascript" src="http://i.cdn.example.com:8080/ExampleUrl/.element/js/3.0/connect/connect-lite.js"></script>
                                                                                                                630  628
<script src="http://i.cdn.example.com:8080/ExampleUrl/.element/js/3.0/video/cvp_suppl.js" type="text/javascript"></script>   ← 632
<script src="http://i.cdn.example.com:8080/ExampleUrl/.element/js/3.0/video/cvp.js" type="text/javascript"></script>   ← 634
<script src="http://i.cdn.example.com:8081/xslo/cvp/ads/freewheel/js/fwjslib_1.1.js?version=1.1" type="text/javascript"></script>
                                                                                                                          636

<script type="text/javascript">
        var ExampleUrlCVPAdSection = 'edition.ExampleUrl.com_main_homepage';
</script>
<script type="text/javascript">
   var ExampleUrlIsSectionPage = true;
</script>

<script type="text/javascript"
src="http://i2.cdn.example.com/ExampleUrl/.element/js/2.0/ad_head0.js"></script>   ← 638
<script type="text/javascript"
src="http://i2.cdn.example.com:8080/ExampleUrl/ExampleUrl_adspaces/ExampleUrl_adspaces.js"></script>   ← 640
</head><body id="ExampleUrlMainPage">  <div id="ExampleUrl_ipadappbanner"></div>

<script>
<style>
```

FIG. 6

710
GET /ExampleUrl/.element/css/3.0/common.css HTTP/1.1
Host: ExampleUrl.com
Accept:*/*
Accept-Charset:ISO-8859-1,utf-8
Accept-Encoding:gzip,deflate,sdch
Accept-Language:en-US,en;q=0.8
Cookie:euvmcehwi6vxoUlm9CJntw:
User-Agent:Mozilla/5.0 (Macintosh; U; Intel Mac OS X 10_6_4; en-US) AppleWebKit

712
GET /ExampleUrl/.element/css/3.0/common.css HTTP/1.1
Host: ExampleUrl.com
Accept:*/*
Accept-Charset:ISO-8859-1,utf-8
Accept-Encoding:gzip,deflate,sdch
Accept-Language:en-US,en;q=0.8
Cookie:euvmcehwi6vxoUlm9CJntw:
User-Agent:Mozilla/5.0 (Macintosh; U; Intel Mac OS X 10_6_4; en-US) AppleWebKit 714
HTTP/1.1 200 OK age:113571
cache-control:public, max-age=1728000
content-encoding:gzip
content-length:95
content-type:text/javascript; charset=UTF-8
date:Tue, 14 Dec 2010 23:23:22 GMT
etag:"dibuh2nvn1ew"
expires:Mon, 03 Jan 2011 23:23:22 GMT
last-modified:Fri, 05 Sep 2003 02:11:15 GMT
server:GSE 716
Object is cacheable.
Continue to deliver reference as-is.

718
HTTP/1.1 200 OK age:113571
cache-control:public, max-age=1728000
content-encoding:gzip
content-length:95
content-type:text/javascript; charset=UTF-8
date:Tue, 14 Dec 2010 23:23:22 GMT
etag:"dibuh2nvn1ew"
expires:Mon, 03 Jan 2011 23:23:22 GMT
last-modified:Fri, 05 Sep 2003 02:11:15 GMT
server:GSE

FIG. 7

810
GET /ExampleUrl/.element/css/3.0/main.css HTTP/1.1
Host: ExampleUrl.com
Accept:*/*
Accept-Charset:ISO-8859-1,utf-8
Accept-Encoding:gzip,deflate,sdch
Accept-Language:en-US,en;q=0.8
Cookie:euvmcehwi6vxoUlm9CJntw:
User-Agent:Mozilla/5.0 (Macintosh; U; Intel Mac OS X 10_6_4; en-US) AppleWebKit

812
GET /ExampleUrl/.element/css/3.0/main.css HTTP/1.1
Host: ExampleUrl.com
Accept:*/*
Accept-Charset:ISO-8859-1,utf-8
Accept-Encoding:gzip,deflate,sdch
Accept-Language:en-US,en;q=0.8
Cookie:euvmcehwi6vxoUlm9CJntw:
User-Agent:Mozilla/5.0 (Macintosh; U; Intel Mac OS X 10_6_4; en-US) AppleWebKit

814
HTTP/1.1
Cache-Control:no-store, no-cache, must-revalidate, post-check=0, pre-check=0
Content-type:text/html
Date:Thu, 16 Dec 2010 21:00:04 GMT
Expires:Thu, 19 Nov 1981 08:52:00 GMT
Pragma:no-cache
Server:GSF
Transfer-Encoding:chunked

816
Object is not cacheable.
Rewrite reference for future requests.

818
HTTP/1.1
Cache-Control:no-store, no-cache, must-revalidate, post-check=0, pre-check=0
Content-type:text/html
Date:Thu, 16 Dec 2010 21:00:04 GMT
Expires:Thu, 19 Nov 1981 08:52:00 GMT
Pragma:no-cache
Server:GSF
Transfer-Encoding:chunked

FIG. 8

910
GET /ExampleUrl/.element/css/3.0/main.css HTTP/1.1
Host: 216.100.224.98
Accept:*/*
Accept-Charset:ISO-8859-1,utf-8
Accept-Encoding:gzip,deflate,sdch
Accept-Language:en-US,en;q=0.8
Cookie:euvmcehwi6vxoUlm9CJntw:
User-Agent:Mozilla/5.0 (Macintosh; U; Intel Mac OS X 10_6_4; en-US) AppleWebKit

912
GET /ExampleUrl/.element/css/3.0/main.css HTTP/1.1
Host: 216.100.224.98
Accept:*/*
Accept-Charset:ISO-8859-1,utf-8
Accept-Encoding:gzip,deflate,sdch
Accept-Language:en-US,en;q=0.8
Cookie:euvmcehwi6vxoUlm9CJntw:
User-Agent:Mozilla/5.0 (Macintosh; U; Intel Mac OS X 10_6_4; en-US) AppleWebKit

914
HTTP/1.1
Cache-Control:no-store, no-cache, must-revalidate, post-check=0, pre-check=0
Content-type:text/html
Date:Thu, 16 Dec 2010 21:00:04 GMT
Expires:Thu, 19 Nov 1981 08:52:00 GMT
Pragma:no-cache
Server:GSF
Transfer-Encoding:chunked

916
Object is not cacheable.
Reference to object has been rewritten.

918
HTTP/1.1
Cache-Control:no-store, no-cache, must-revalidate, post-check=0, pre-check=0
Content-type:text/html
Date:Thu, 16 Dec 2010 21:00:04 GMT
Expires:Thu, 19 Nov 1981 08:52:00 GMT
Pragma:no-cache
Server:GSF
Transfer-Encoding:chunked

FIG. 9

NETWORK RESOURCE MODIFICATION FOR HIGHER NETWORK CONNECTION CONCURRENCE

CROSS REFERENCE TO RELATED APPLICATION

This application is a continuation of and claims priority to U.S. patent application Ser. No. 13/004,894, titled NETWORK RESOURCE MODIFICATION FOR HIGHER NETWORK CONNECTION CONCURRENCE, filed Jan. 12, 2011, and issued as U.S. Pat. No. 8,620,999 on Dec. 31, 2013, the contents of which are incorporated herein by reference in its entirety for all purposes.

BACKGROUND

Modern Internet browsers limit the number of concurrent TCP connections that can be opened to a given host or domain to a predetermined limit. In many browsers, this limit has been set to six concurrent connections. One reason for configuring browsers to enforce such a limit is to reduce load on servers, which traditionally have had a difficult time managing large numbers of simultaneous TCP connections. Traditional process-based or thread-based servers, under heavy connection load, devote significant processor resources to polling each connection to determine whether traffic has arrived on that connection. If the load becomes too heavy, servers may experience a phenomenon referred to as response throttling, as the servers become unable to respond to requests since their processors are overly taxed polling connections. The requesting clients see the server as unresponsive, and requests often "time out" as the server fails to respond to them.

In recent years event-based web servers, multiplexing Server Load Balancers, and Application Delivery Controllers have become widely available. These devices can handle tens of thousands or hundreds of thousands of TCP connections, meaning the servers no longer have to be "protected" from the clients or may operated with less protection from the clients. However, as web pages become more complicated, these browser imposed limits on concurrent TCP connections can undesirably impair browser performance as perceived by the end user. Many modern web pages are rendered based upon an HTML file that references numerous separately downloadable objects. It is not uncommon for 50 to 100 objects served by the same domain to be referenced by a single HTML file, and the browser must download each object to properly or fully render the web page. A browser that has received such an HTML file parses the file and begins generating requests for the objects referenced therein. However, requests for these objects must be sent over the limited number of (e.g. 6) concurrent TCP connections in a sequential manner. After the first six requests are sent, using the most common limit as an example, subsequent requests must be queued by the browser until the responses have been received. This drastically underutilizes available bandwidth, and leads to longer-than-necessary download time.

Requests are sent serially over each connection, such that a next request cannot be sent until a prior request has been fully responded to by the server. Large objects that are requested early can thus delay downloading of later queued object requests. Packet loss and network congestion on one or more of the connections can further delay data transmission, as the TCP protocol automatically slows down data transfer rates and slowly builds it up again for the congested connection. Further, the rendering of the web page often cannot begin until a set of objects necessary to determine its layout and functionality (e.g., cascading style sheets and embedded scripts) are downloaded. If these objects end up or occur at the end of the queue, the web page may take even longer to render. These various factors result in agonizing delay for users, who stare at incomplete or blank browser pages as the browser churns and waits, attempting to retrieve the various objects necessary to render the web page over the limited number of connections. If the wait is too long, users may give up and move on to a different web page.

Websites with who care about end user performance, and/or are equipped with event based servers or scalable application controllers will want to increase the number of concurrent TCP connections made by clients so that more objects downloads can be parallelized, thus reducing the overall "clock time" from initial page request to completed rendering.

SUMMARY

Implementations for network resource modification for enabling higher network connection concurrence are disclosed. As one example, a method is disclosed for a network appliance connectable to a client device via a wide area network and one or more server devices via a local area network. The method includes receiving a request from a client device for a network resource having a plurality of references to objects, and retrieving the network resource from one or more server devices. The method further includes modifying the network resource to cause the client device to open a greater number of concurrent TCP connections to the network appliance than otherwise would have been opened had the network resource not been modified due to a browser program imposed limit on a number of concurrent TCP connections. The method further includes sending the modified network resource to the client device, receiving a plurality requests for the objects from the client device over the greater number of concurrent TCP connections, and replying to the plurality of requests for the objects by sending the objects to the client device over the greater number of concurrent TCP connections.

Claimed subject matter, however, is not limited by this summary as other implementations are disclosed by the following written description and associated drawings.

DETAILED DESCRIPTION

To address the issues identified above, systems and methods are provided according to which a greater number of concurrent TCP connections may be opened between a client device and a network appliance than would have otherwise been opened due to browser imposed concurrent connection limits. This is accomplished by rewriting or otherwise modifying the network resource to include one or more different references to objects, or by redirecting the client device to one or more different TCP connections points from which objects may be obtained. One or more of these approaches for increasing the number of concurrent TCP connections established by a client device to greater than a browser imposed limit for concurrent requests for objects to a single host or domain may reduce object fetching time, rendering time, processing time, and/or delay experienced by the client device.

Figure 1:
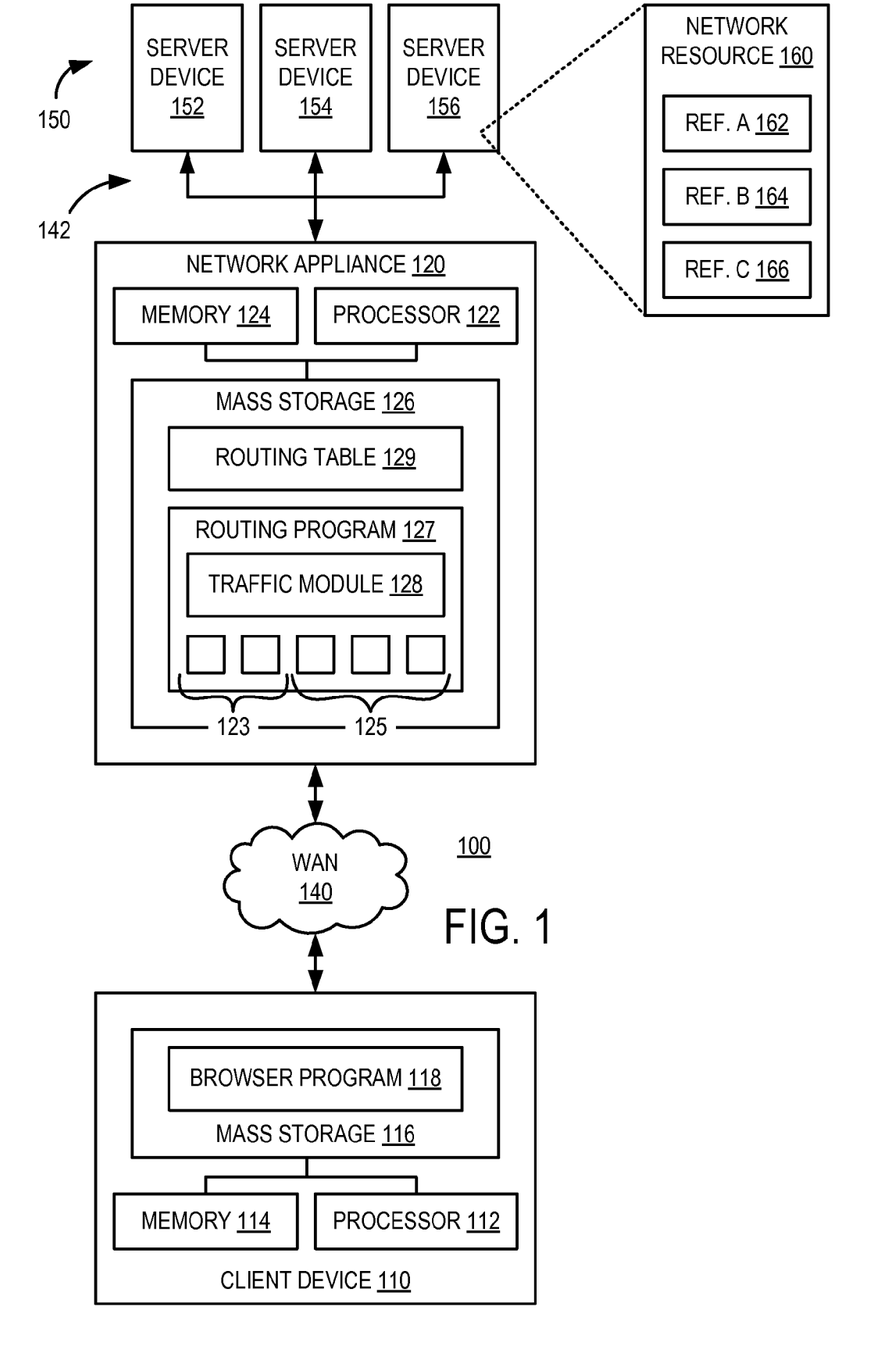
FIG. 1 is a schematic diagram depicting an example system according to one disclosed embodiment.

FIG. 1 is a schematic diagram depicting an example system 100 according to one disclosed embodiment. System 100 includes a network appliance 120 connected or connectable to a client device 110 via a wide area network 140 and one or more server devices such as server devices 152, 154, 156 of a data center 150 via a local area network 142. Wide area network 140 may comprise the Internet or portion thereof, for example.

Client device 110 may represent an example client device of a number of client devices that may be concurrently connected to network appliance 120 via wide area network 140. Client device 110 may comprise one or more processors 112. Client device 110 may comprise mass storage 116 and memory 114 that may have or include instructions stored thereon, such as browser program 118, for example. Instructions such as, for example, browser program 118 may be executed at client device 110 by one or more processors 112. Browser program 118 may be configured to request objects from network appliance 120 or other suitable network server, and may be configured to enforce a browser imposed limit on the number of concurrent TCP connections that may be made by the browser to a single host or domain. Client device 110 may be implemented as a user operable personal computer, mobile device, component of an electronic device, or other suitable implementation.

Network appliance 120 may comprise one or more processors 122. Network appliance 120 may comprise mass storage 126 and memory 124 that may have or include instructions stored thereon, such as routing program 127, for example. Instructions such as, for example, routing program 127 may be executed at network appliance 120 by one or more processors 122. In at least one implementation, network appliance may be implemented as a server/load balancer that provides both server functionality (e.g., proxying of one or more other servers) and load balancing functionality for servers of data center 150, among other suitable functions. Typically, it will be appreciated that the network appliance manages many client-side TCP connections over WAN 140, and multiplexes client connections to a smaller number of server-side TCP connections over the LAN 142, which are typically persistent connections. The network appliance receives HTTP requests from the various clients over those client-side TCP connections, and then multiplexes those HTTP requests over appropriate server-side persistent TCP connections. The network appliance selects a back end server for hosting a session with a remote client based on various load balancing factors, including server response time, server processor load, memory usage, etc.

It will be appreciated that the network appliance does not merely route packets back and forth to the backend servers, but rather acts as a TCP endpoint for client side connections, where the packets are assembled and interpreted as higher level protocol communications, such as HTTP requests and responses, and then resent over the server-side TCP connections for server processing. In this intermediate position, the network appliance is in a position to modify the content of the traffic flowing through it, as will be described below.

Routing program 127 may comprise a traffic module 128. Traffic module 128 is configured to receive, from client device 110 via wide area network 140, a request for a network resource 160. A network resource may refer to a target or a referent of a Uniform Resource Locator (URL) or other suitable Uniform Resource Identifier (URI). For example, a network resource may comprise an HTML object, a javascript object, a style sheet object, a flash object, a media content object such as an image file, a video file, an audio file, a text file, etc. Accordingly, a network resource is itself an object that may be requested by a client device.

A network resource may have one or more references to one or more other objects. For example, network resource 160 may have a plurality of references (e.g., 162, 164, 166, etc.) to other objects of network resource 160 that may be requested and received by the client device. References to objects may include a URL or other suitable URI. As one example, a network resource that comprises an HTML object that defines a webpage document may reference one or more other objects (e.g., media content object, javascript object, etc.) that are embedded in the webpage document, are to be rendered, or executed by the browser program as part of the webpage document. A network resource may have any suitable number of references to objects, including tens, hundreds, thousands or more references to respective objects.

Traffic module 128 of network appliance 120 is configured to retrieve network resource 160 from one or more of server devices 152, 154, 156, etc. via local area network 142. As one example, traffic module 128 may request network resource 160 from server device 156 by sending a request message specifying network resource 160 to server device 156 via local area network 142. Server device 156 may respond to the request message by sending network resource 160 to network appliance 120. Network appliance 120 may store an instance of network resource 160 in a cache on mass storage 120 or memory 124, for example.

In at least some implementations, traffic module 128 is configured to modify the network resource to cause the client device that requested the network resource to open a greater number of concurrent TCP connections to the network appliance via the wide area network than otherwise would have been opened had the network resource not been modified, due to the browser imposed limit on concurrent TCP connections to a single host or domain. As one example, traffic module 128 is configured to parse the network resource retrieved from the one or more server devices to identify the plurality of references to the objects, and rewrite at least one or more of the plurality of references to the objects to specify one or more different references to at least one or more of the objects to cause the client to open the greater number of concurrent TCP connections.

The one or more different references may refer to or indicate one or more different IP addresses, one or more different host names, and/or one or more different ports. Rewriting the references in this manner will cause the browser program to send one or more subsequent requests to the addresses in the rewritten references with the different IP addresses, host names, and/or ports. Since the browser imposed limits on concurrent connections apply to specific host domain/IP address and port combinations, rewriting references in a manner can be used to avoid reaching the browser imposed limit, thereby increasing or maximizing the concurrent TCP connections that may be opened to retrieve objects referenced in the network resource. For example, each reference may be rewritten to have a unique host name/IP address and port combination or at least so that the number of rewritten references in the network resource that share a common host name/IP address and port combination will be at or below the browser imposed limit on concurrent TCP connections. Typically, the network appliance itself will be configured as the host server for all of the unique host name/IP address and port combinations generated in the rewritten references, and is configured to retrieve the objects requested from the backend servers.

Hence, at least one or more of the greater number of concurrent TCP connections may be opened to the network appliance hosting the host name/IP address and port combinations of the one or more different, rewritten references. For example, if network resource was requested by client device 110 via one of ports 123, then network resource 160 may be modified by traffic module 128 so that client device 110 requests one or more objects of network resource 160 via a different port 125. As one example, if browser program 118 limits or supports a maximum of six (6) concurrent TCP connections to a host or domain, the greater number of concurrent TCP connections may include seven (7) or more concurrent TCP connections to different host name/IP address and port combinations served by the network appliance. In this manner higher TCP connection concurrency may be achieved, which in turn reduces the dilatory effect of request queuing (e.g., the browser queuing new requests until responses from previous requests have been received over the limited number of concurrent TCP connections) and TCP transmission rate slowdown due to detected congestion or packet loss on any one of the connections, on the ultimate rendering of the network resource and all of its referenced objects.

In at least some implementations, traffic module 128 is configured to identify based, at least in part, on cache control header information or object type information of an object referenced in the network resource whether the object is a cacheable object. If the object is identified as a cacheable object, then traffic module 128 is configured to rewrite a reference to the object to a first different reference to the cache where the object resides. If the object is determined to be a non-cacheable object, then traffic module 128 is configured to rewrite a reference indicating a host name of the object to a second different reference indicating an IP address to the object. Traffic module 128 is configured to send the modified or rewritten network resource, or redirect message to the client device via the wide area network. The browser program will, in turn, send a request for the object at the rewritten IP address. It will be appreciated that this will avoid the browser performing a DNS lookup for the original host name address, since a DNS lookup is not required for an IP address. As a result, the browser program does not have to initiate the DNS request nor wait for the DNS response, reducing latency.

In at least some implementations, traffic module 128 is configured to receive a request from client device 110 for a network resource, and send a redirect message to client device 110 via wide area network 140 to cause client device 110 to request the network resource from one or more different TCP connections than the initial TCP connection by which the initial request for the network resource was received. In this way, a client device may open a greater number of concurrent TCP connections than may otherwise be opened had the client device not been redirected, due to the browser imposed limits on concurrent TCP connections to the same host/domain and port combination. The redirect message may be written, for example, so that client device 110 requests the network resource from one of ports 125 after initially requesting the network resource from one of ports 123. The traffic module may be configured to send redirect messages to a variety of different host name/IP address and port combinations such that the number of objects at a single rewritten host name/IP address and port combination does not exceed the browser imposed limit for concurrent TCP connections, to thereby maximize parallelism of connections. It will be appreciated that all of the host name/IP address and port combinations are typically hosted by the network appliance.

In at least some implementations, traffic module 128 may include an administrator interface for enabling an administrative user to turn modification of network resources or redirecting of client devices on or off depending on administrator preference. For example, if modification of network resources is turned off at traffic module 128, then traffic module 128 does not rewrite or otherwise modify the network resource, nor does traffic module 128 redirect the client device in order to open a greater number of concurrent TCP connections.

Mass storage 126 of network appliance 120 may further include a data store. As one example, a data store of mass storage 126 may include a routing table 129. Routing table 129 may define relationships between client-side ports/sockets over which client-side TCP connections are established that connect network appliance 120 to clients over wide area network 140 and server-side ports/sockets over which server-side TCP connections that connect network appliance 120 to back end servers over local area network 142. Such ports or sockets are typically software constructs that connect the client program to the server program. Routing table 129 may include a number of virtual network addresses in at least some implementations. For example, traffic module 128 may be configured to establish virtual address space (e.g., virtual host names, IP addresses and port combinations) on which the network appliance is configured to receive and respond to additional requests from client device 110. Virtual address space may be established by traffic module 128 dynamically generating the virtual address space in response to receiving the request for the network resource from the client device, or by traffic module 128 referencing a pre-defined set or list of virtual network addresses to identify the virtual address space. Traffic module 128 is configured to listen on one or more ports corresponding to the virtual network addresses for requests from a client device.

Traffic module 128 is configured to receive a plurality requests for objects from a client device via wide area network 140 over the greater number of concurrent TCP connections. Traffic module 128 is configured to send the requests to a selected back end server, receive a reply including the object from the back end server, and reply to the plurality of requests for the objects by sending the objects to the client device via the wide area network over the greater number of concurrent TCP connections. By increasing concurrency of TCP connections in this manner, the network appliance can minimize or reduce the delays associated with browser request queuing, and TCP transmission slow down due to congestion and packet loss discussed above. Traffic module 128 may also be configured to perform one or more of the operations, processes, or methods described in greater detail with reference to the flow diagrams of FIGS. 2, 3, and 4.

Figure 2:
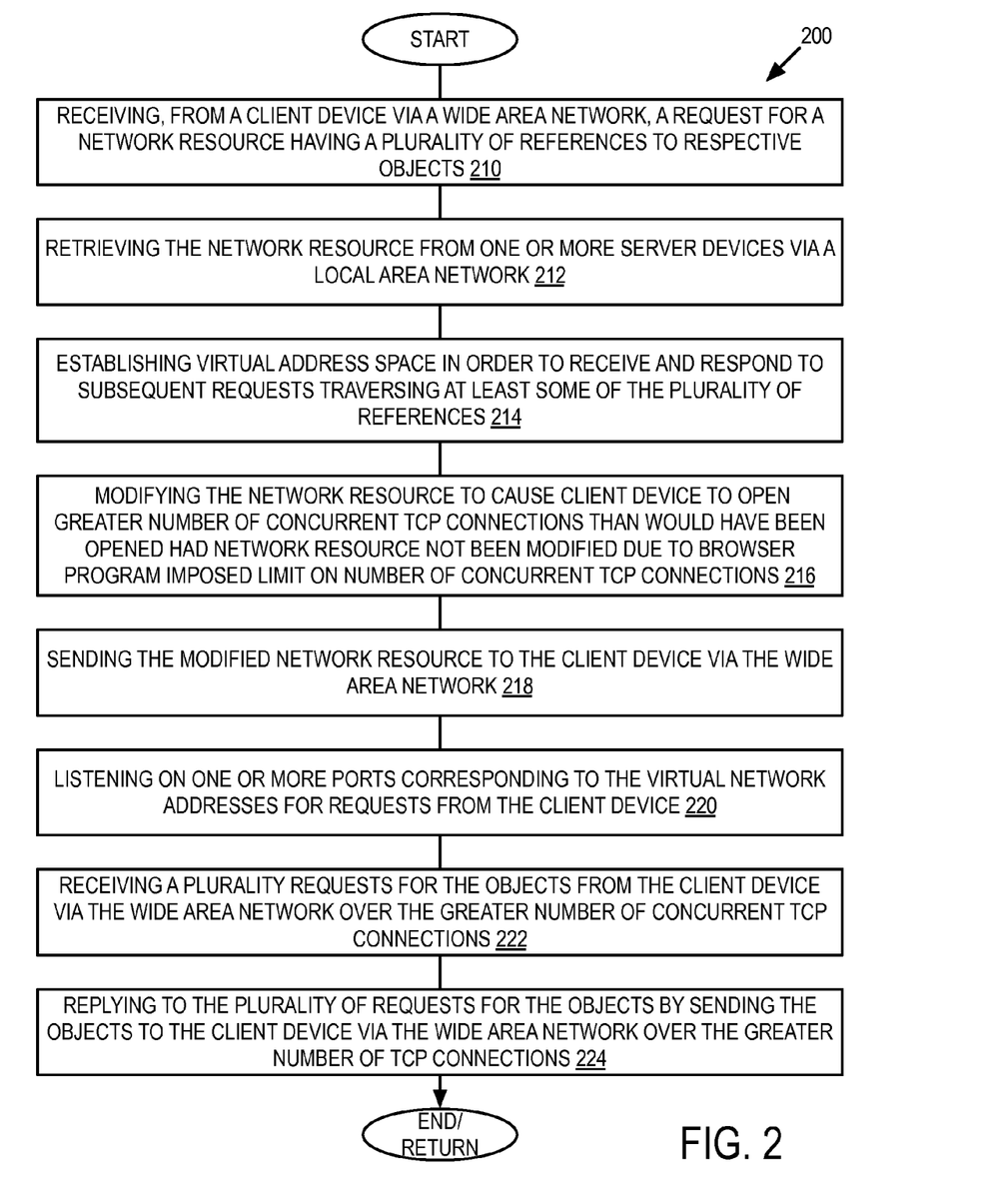
FIG. 2 is a flow diagram depicting an example method for increasing network connection concurrency according to one disclosed embodiment.

FIG. 2 is a flow diagram depicting an example method 200 for increasing network connection concurrency according to one disclosed embodiment. Method 200 may comprise a method for network communications among a network appliance connectable to a client device via a wide area network and a server device via a local area network. As one example, method 200 may be performed by previously described network appliance 120 executing traffic module 128. However, other suitable hardware and software components may also be used to implement method 200.

At 210, the method includes receiving, from a client device via a wide area network, a request for a network resource having a plurality of references to objects (i.e., object references). At 212, the method includes retrieving the network resource from the one or more server devices via a local area network or other suitable network. As one example, a request message may be sent to the one or more server devices indicating the network resource requested by the client device. The one or more server devices may respond to the request message by sending the network resource as one or more response messages. The server device may be a network appliance acting as a server/load balancer as described above, which retrieves the network resource from one of a plurality of back end servers.

At 214, the method includes establishing virtual address space in order to receive and respond to subsequent requests traversing at least some of the plurality of references. As one example, establishing virtual address space comprises dynamically generating the virtual address space (e.g., one or more virtual network addresses) in response to receiving the request for the network resource from the client device. As another example, establishing virtual address space comprises referencing a pre-defined list of virtual network addresses to identify the virtual address space. The virtual network address space may be established by a network appliance, as described above.

In at least some implementations, the method at 214 may further include, in response to receiving the request for the network resource from the client device, determining that network address space is referenced in at least some of the plurality references not currently being served by the network appliance, and establishing virtual address space in order to receive and respond to subsequent requests traversing at least some of the plurality of references.

At 216, the method includes modifying the network resource to cause the client device to open a greater number of concurrent TCP connections to the network appliance via the wide area network than otherwise would have been opened had the network resource not been modified, due to browser program imposed limits on concurrent TCP connections to a single host name or IP address and port combination. In at least some implementations, modifying the network resource comprises parsing the network resource retrieved from the one or more server devices to identify the plurality of references to the objects, and rewriting one or more of the plurality of references to specify one or more different references to one or more of the objects to cause the client to open the greater number of concurrent TCP connections. For example, the one or more different references may refer to one or more different network locations including: one or more different IP addresses, one or more different host names, and/or one or more different ports. Accordingly, one or more of the greater number of concurrent TCP connections may be opened to the one or more different network locations referred to by the one or more different references.

In at least some implementations, modifying the network resource at 216 may comprise modifying the network resource in response to exceeding a threshold condition with respect to a connection performance parameter of one or more pre-existing TCP connections with the client device over the wide area network. The connection performance parameter may include, for example, one or more of a round trip time, packet loss, TCP receive window, or congestion window. As one example, if the round trip time (e.g., as measured by or at the network appliance) of a pre-existing TCP connection with the client device exceeds a threshold round trip time or packet loss exceeds a threshold packet loss, then 216 may be performed to cause the client device to open a greater number of concurrent TCP connections. As another example, if the TCP receive window for a given TCP connection (e.g., as measured by or at the client device, and communicated to the network appliance) is less than a threshold TCP receive window or congestion window (e.g., as measured by or at the network appliance) is less than a threshold congestion window, then 216 may be performed to cause the client device to open a greater number of concurrent TCP connections.

At least some of the one or more different TCP connections may be one or more pre-existing TCP connections between the client device and the network appliance. However, at least some of the one or more different TCP connections may be one or more yet to be established TCP connections between the client device and the network appliance. In at least some implementations, pre-existing TCP connections may be favored over yet to be established TCP connections to reduce or avoid an additional amount of time to set up a new TCP connection, and to take advantage of an older TCP connection being further along or through a TCP slow start phase, which enables the network appliance to send more bytes of data without waiting for client ACKs.

In at least some implementations, modifying the network resource at 216 may comprise modifying the network resource in response to a number of the plurality of references in the network resource exceeding the browser program imposed limit on the number of concurrent TCP connections. As one example, the greater number of concurrent TCP connections includes seven (7) or more concurrent TCP connections if the browser program of the client device imposes a limit of six (6) or fewer concurrent TCP connections to an individual host name/IP address and port number combination. In at least some implementations, the method at 214 and/or 216 may not be performed if the number of references or the number of objects referenced in the network resource does not exceed a limit imposed by the browser program on the number of concurrent TCP connections to an individual host name/IP address and port number combination.

In at least some implementations, modifying the network resource at 216 may comprise modifying the network resource based, at least in part, on the number of the plurality of reference in the network resource. For example, a number of references in the network resource at 216 may be based on the limit imposed on the number of concurrent TCP connections that may be opened to an individual host name/IP address and port number combination to avoid such a limit imposed on the number of concurrent TCP connections.

In at least some implementations, modifying the network resource at 216 may comprise modifying the network resource based, at least in part, on an object type of the network resource requested by the client device or an object type of one or more of the objects referenced in the network resource. As one example, some object types may be rewritten to a first different reference and other object types may be rewritten to a second different reference. As another example, some object types may not be rewritten or otherwise modified while other object types may be rewritten or otherwise modified.

At 218, the method includes sending the modified network resource to the client device via the wide area network. At 220, the method includes listening on one or more ports corresponding to the virtual network addresses or other network locations referenced in the modified network resource for requests from the client device. At least some of the plurality of requests may be received at network locations corresponding to the virtual network space.

The client device may receive the network resource and may request objects referenced in the network resource, for example, via a browser program of the client device. At 222, the method includes receiving a plurality requests for the objects referenced in the network resource from the client device via the wide area network over the greater number of concurrent TCP connections. At 224, the method includes replying to the plurality of requests for the objects by sending the objects to the client device via the wide area network over the greater number of concurrent TCP connections. It will be appreciated that a network appliance may receive the requests, retrieve the objects from back end servers, and send the replies including the objects to the requesting clients, as described above.

Figure 3:
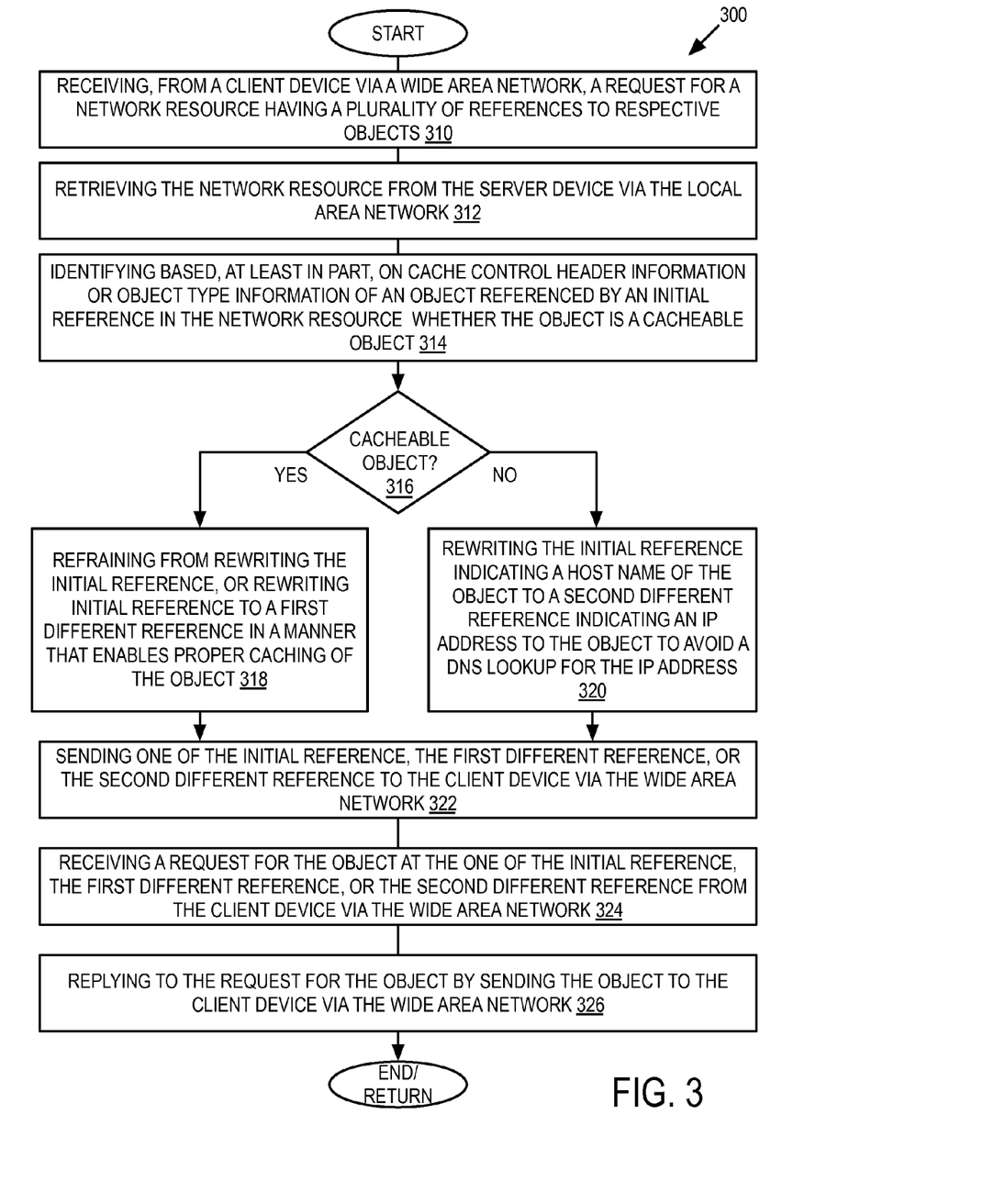
FIG. 3 is a flow diagram depicting an example method according to another disclosed embodiment.

FIG. 3 is a flow diagram depicting an example method 300 according to another disclosed embodiment. Method 300 may comprise, for example, a method for a network appliance connected or connectable to a client device via a wide area network and one or more server devices via a local area network. As one example, method 300 may be performed by previously described network appliance 120 executing traffic module 128. However, other suitable hardware and software components may also be used to implement method 300.

At 310, the method includes receiving, from the client device via the wide area network, a request for a network resource having a plurality of references to respective objects. At 312, the method includes retrieving the network resource from the server device via the local area network. The method at 310 and 312 may be similar, for example, to previously described method 200 at 210 and 212, respectively.

At 314, the method includes identifying based, at least in part, on cache control header information or object type information of one or more objects referenced in the network resource whether each object is a cacheable object. The method may include treating the object reference for a cacheable object in a consistent manner that does not break the cache. For example, if an object is determined at 316 to be a cacheable object, then at 318, the method includes refraining from rewriting the initial reference (i.e., maintaining the original object reference). Alternatively, the method at 318 may include rewriting the initial reference to first different reference in a manner that enables the browser program to properly cache the object in a browser side cache and retrieve the object from the browser side cache during a current browsing session or a subsequent browsing session. Rewriting the initial reference for a cacheable object may include rewriting the initial reference to the object to a first different reference each and every time the browser requests that cacheable object during this browsing session and future browsing sessions, or applying a programmatic rubric to rewrite the initial reference to the object to a network address in virtual network address space that is the same each and every time the cacheable object is requested by the browser program. In at least some implementations, a reference to a cacheable object that includes a host name may be rewritten to an IP address each and every time to avoid DNS lookup by a browser program of the client device, and to enable proper catching of the object by the browser program.

If the object is determined at 316 to be a non-cacheable object, then the method at 320 includes rewriting the initial reference in the network resource indicating a host name of the object to a second different reference indicating an IP address to the object. It will be appreciated that by doing so, after the network resource is sent to the browser program, the browser program will not have to perform a DNS lookup in order to retrieve the object at the rewritten reference, since DNS lookups are not required for IP addresses. Accordingly, processing time or delay associated with performing the DNS lookup may be avoided or reduced in some examples. In other examples, however, the initial reference may be rewritten to any suitable network location including host names or domain names.

The method at 314 may further include identifying a change of the cache control header information of the object indicating a change from a non-cacheable object to a cacheable object, and rewriting the second different reference to the first different reference or the initial reference in response to identifying the change. In this way, a browser program of the client device may properly maintain caching of the object.

At 322, the method includes sending one of the initial reference, the first different reference, or the second different reference to the client device via the wide area network. The client device receives one of the initial reference, the first different reference, or the second different reference via the wide area network, and may send a request for the object by traversing the initial reference, the first different reference, or the second different reference via the wide area network. At 324, the method includes receiving a request for the object at one of the initial reference, the first different reference, or the second different reference from the client device via the wide area network. At 326, the method includes replying to the request for the object by sending the object to the client device via the wide area network.

As previously described with reference to 314-320 of method 300 of FIG. 3, the different references that are rewritten for objects may be based, at least in part, on cache control header information or object type information identified from objects referenced in the network resource. In at least some implementations, previously described method 200 of FIG. 2 may further comprise identifying based, at least in part, on cache control header information or object type information of an object referenced in the network resource whether the object is a cacheable object. If the object is a cacheable object, then 216 of method 200 may further comprise modifying the network resource in a manner that enables proper caching of the object as previously discussed. If the object is a non-cacheable object, then method 200 may include modifying the network resource to indicate an IP address corresponding to a network location where the object resides, which will enable the browser program to retrieve the object by traversing the IP address without performing a DNS lookup for the IP address of the network location, thereby reducing latency.

Figure 4:
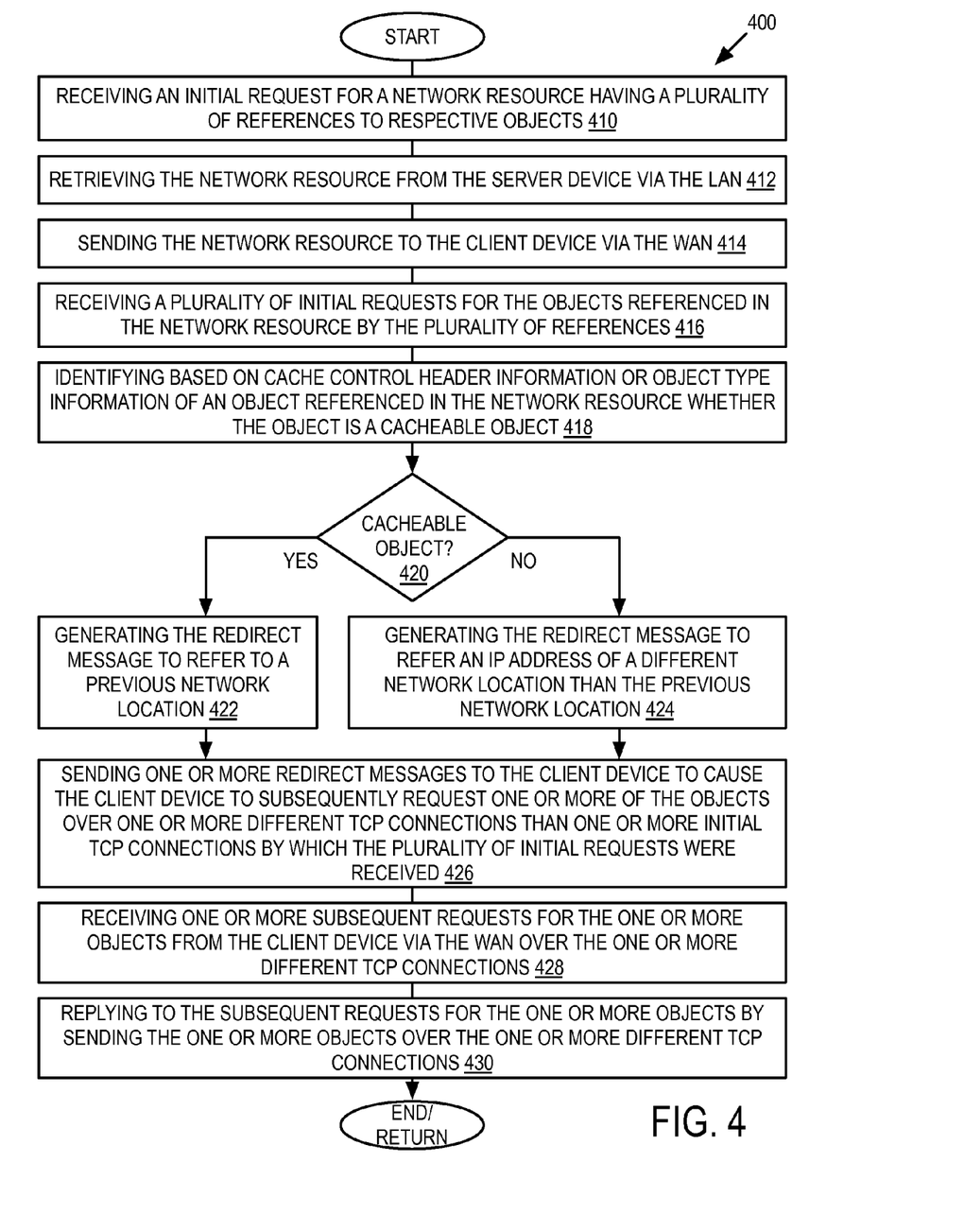
FIG. 4 is a flow diagram depicting an example method according to yet another disclosed embodiment.

FIG. 4 is a flow diagram depicting an example method 400 according to yet another disclosed embodiment. Method 400 may comprise, for example, a method for a network appliance connected or connectable to a client device via a wide area network and one or more server devices via a local area network. As one example, method 400 may be performed by previously described network appliance 120 executing traffic module 128. However, other suitable hardware and software components may also be used to implement method 400.

At 410, the method includes receiving, from the client device via the wide area network, an initial request for a network resource having a plurality of references to respective objects. At 412, the method includes retrieving the network resource from the server device via the local area network. The method at 410 and 412 may be similar, for example, to previously described method 200 at 210 and 212, respectively.

At 414, the method includes sending the network resource to the client device via the wide area network. In at least some implementations, at least some of the references in the network resource may be modified as previously described with reference to method 200 of FIG. 2, for example. However, in at least some implementations, the network resource may be sent to the client device without modifying references in the network resource. The client device may receive the network resource and request the respective objects by traversing the references (whether modified or unmodified) in the network resource.

At 416, the method includes receiving, from the client device via the wide area network, a plurality of initial requests for the objects referenced in the network resource by the plurality of references. In response to receiving the initial requests from the client device, the network appliance may request and receive the respective objects from one or more backend server devices, for example, as previously described at 212 of FIG. 2.

At 418, the method includes identifying based, at least in part, on cache control header information or object type information of an object referenced in the network resource by the plurality of references whether the object is a cacheable object. As one example, the network appliance may parse HTTP GET messages received from the client device or HTTP 200 OK messages received from the backend server devices that accompany the objects for the cache control header information or object type information.

If an object is determined at 420 to be a cacheable object, then the method at 422 includes generating a redirect message to refer to a previous network location from which the client device previously requested and received the object. The redirect message may be generated to provide the previous network location to the client device in a manner that enables a browser program of the client device to properly retrieve the object from the browser side cache.

If an object is determined at 420 to be a non-cacheable object, then the method at 422 includes generating a redirect message to refer to an IP address of a different network location than the previous network location to cause a browser program to retrieve the object from the IP address via a different TCP connection of the one or more different TCP connections without performing a DNS lookup for the IP address of the different network location.

At 426, the method includes in response to receiving the plurality of initial requests from the client device, sending one or more of the redirect messages generated at 422 or 424 to the client device via the wide area network to cause the client device to subsequently request one or more of the objects via the wide area network over one or more different TCP connections than one or more initial TCP connections by which the plurality of initial requests were received. An example of a redirect message is an HTTP 302 redirect message. The one or more redirect messages may indicate respective network locations to be used by the client device with which to establish one or more different TCP connections. The one or more different references refer to one or more different network locations including: one or more different IP addresses, one or more different host names, and/or one or more different ports, for example, as previously described.

One or more of the greater number of concurrent TCP connections may be opened to the one or more different network locations referred to by the one or more different references. By generating redirect messages for one or more of the plurality of references to specify one or more different references to the one or more of the objects, the client can open a greater number of concurrent TCP connections to the network appliance via the wide area network than otherwise would have been opened had the one or more redirect messages not been sent to the client device due to a browser program imposed limit on a number of concurrent TCP connections. As previously described, at least some of the one or more different TCP connections may include one or more pre-existing TCP connections between the client device and the network appliance to avoid TCP setup time or reduce the number of new TCP connections established with the network appliance by the client device.

At 428, the method includes receiving one or more subsequent requests for the one or more objects from the client device via the wide area network over the one or more different TCP connections. In response to receiving the requests for the one or more objects from the client device, the networking appliance may request and receive the one or more objects from one or more backend servers. At 430, the method includes replying to the subsequent requests for the one or more objects by sending the one or more objects to the client device via the wide area network over the one or more different TCP connections.

In at least some implementations, sending the one or more redirect messages to the client device may comprise sending a redirect message of the one or more redirect messages to the client device based, at least in part, on an object type of an object requested by the client device. For example, as previously described, objects may be redirected differently based on cache control information. In at least some implementations, sending the one or more redirect messages to the client device may be performed in response to the client device exceeding a threshold condition with respect to a connection performance parameter of one or more pre-existing TCP connections with the client device over the wide area network. The connection performance parameter may include, for example, one or more of a round trip time, packet loss, TCP receive window, or congestion window.

In at least some implementations, in response to receiving the request for the network resource from the client device, the method at 210 may further include determining that network address space is referenced in at least some of the plurality references not currently being served by the network appliance, and establishing virtual address space in order to receive and respond to the one or more subsequent requests traversing each of the at least some of the plurality of references. As previously described, establishing virtual address space may include dynamically generating the virtual address space in response to receiving the request for the network resource from the client device, or referencing a pre-defined list of virtual network addresses to identify the virtual address space.

Figure 5:
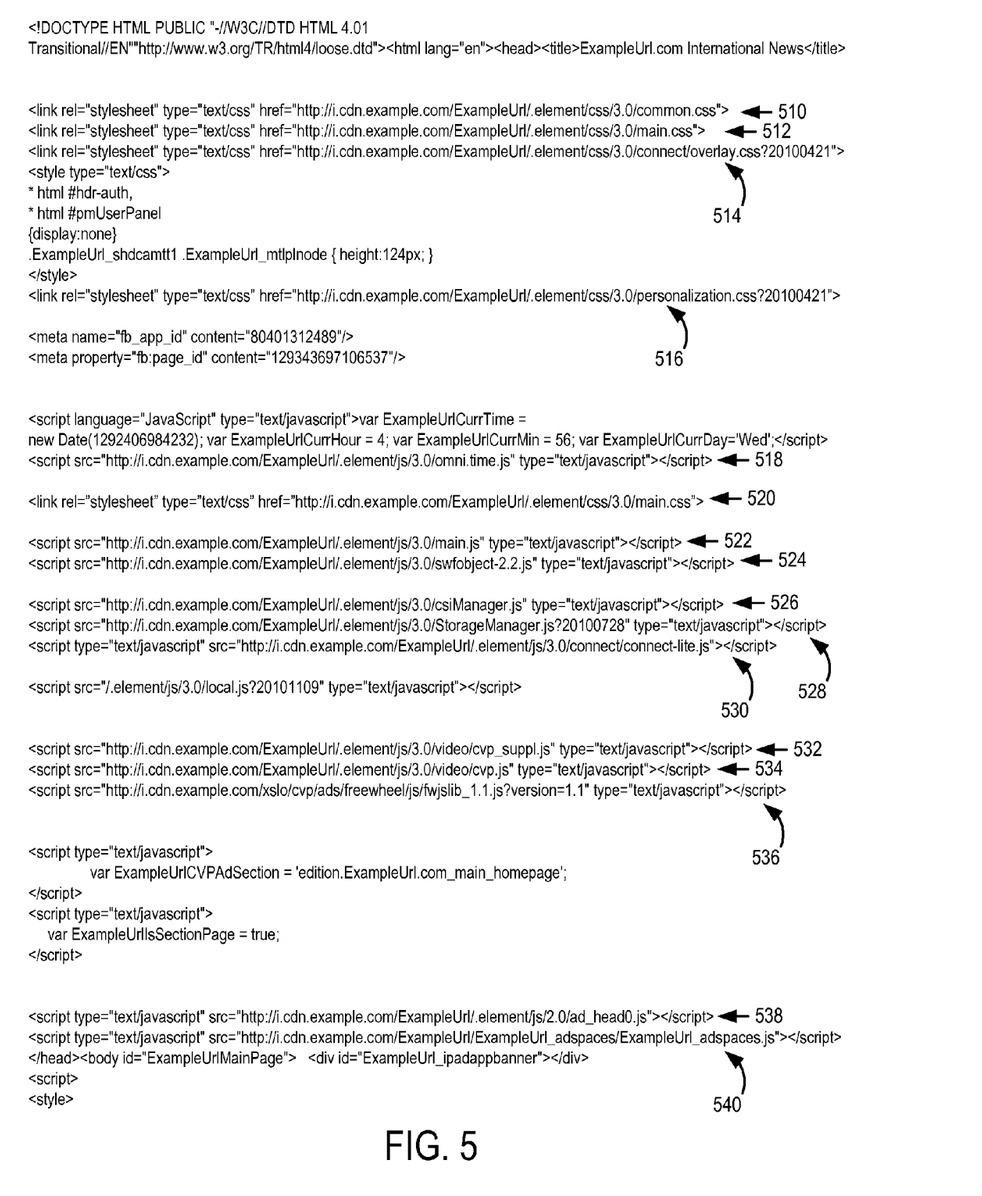
FIG. 5 depicts an example network resource according to one disclosed embodiment.
Figure 6:
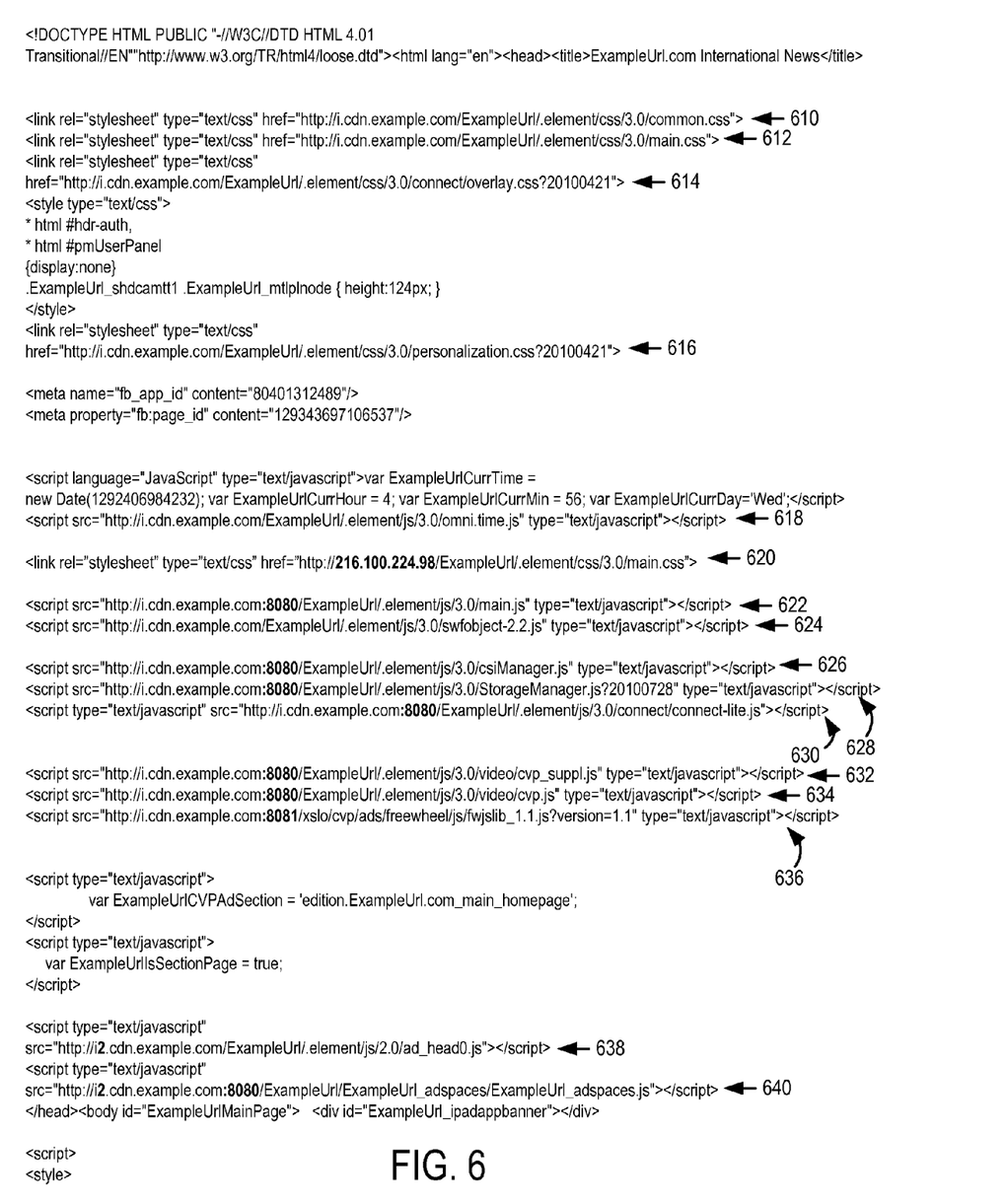
FIG. 6 depicts an example of a rewritten network resource of the example network resource of FIG. 5 according to one disclosed embodiment.

FIG. 5 depicts an example of an initial HTML file of a network resource having a number of object references that may be modified, for example, by a network appliance rewriting at least some of the object references to obtain the example rewritten HTML file of FIG. 6. The rewritten HTML of FIG. 6 includes a number of different host name/IP address and/or port combinations to avoid browser imposed concurrent TCP connection limits. The initial HTML file of FIG. 5 includes a number of object references 510-540. The rewritten HTML file of FIG. 6 includes a number of object references 610-640 that have been rewritten, for example, by a network appliance as previously described. The example rewritten portions of the object references are depicted in bold font in FIG. 6.

As one example, object reference 618 has been rewritten from object reference 518 to include IP address "216.100.224.98". As another example, object reference 622 has been rewritten from object reference 522 to include TCP port number "8080". Object references 626-634 have also been rewritten to include TCP port number "8080". As another example, object reference 636 has been rewritten from object reference 536 to include TCP port number "8081". As yet another example, object reference 638 has been rewritten to include host name portion "i2" rather than the initial host name portion "i" of 538. Object reference 640 has been rewritten from object reference 540 to include both a different host name and a different port number. The rewritten portions of the network resource depicted in FIG. 6 have six (6) or less object references of a particular host name/IP address and/or port combination, thereby avoiding a browser imposed limit of six (6) concurrent TCP connections to an individual host name/IP address and/or port combination. Accordingly, the example rewritten object references depicted in FIG. 6 enable a greater number of concurrent TCP connections to be opened by a client device than otherwise would have been opened had the object references not been modified.

Figure 7:
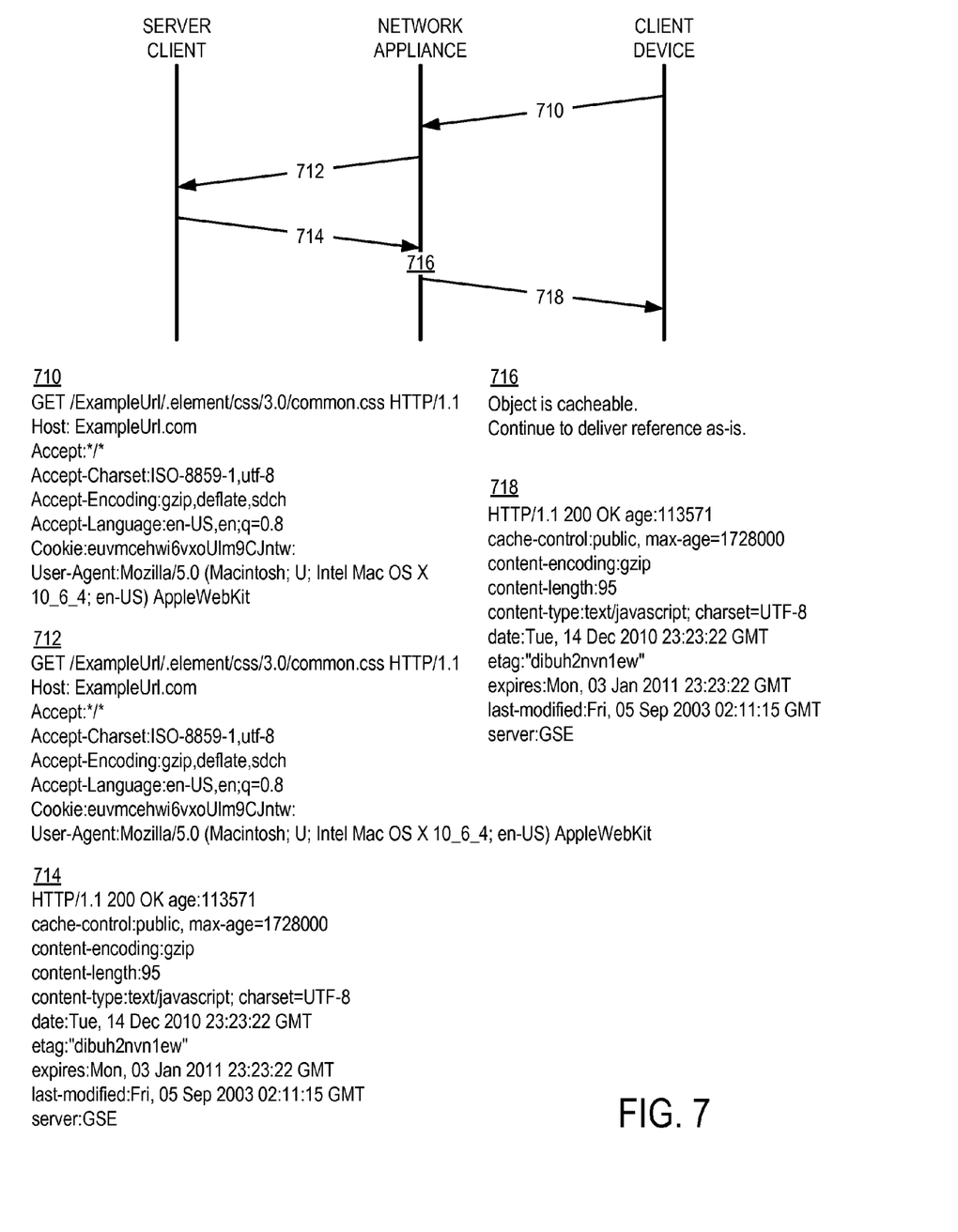
FIG. 7 is a network flow diagram depicting an example response to an initial client request for a cacheable object according to one disclosed embodiment.

FIG. 7 depicts an example network flow diagram according to a disclosed embodiment in which an initial request by a client device for a cacheable object referenced in a network resource is received by a network appliance and processed according to the previously described method implementations. In FIG. 7, a client device sends a request for an object as an HTTP GET message 710 to a network appliance. As one example, the network resource may refer to the HTML file of FIG. 5. The network appliance receives HTTP GET message 710 sent by the client device and in response, sends an HTTP GET message 712 to a server device hosting the requested object. Messages 710 and 712 are identical in this particular example.

The server device receives HTTP GET message 712 from the network appliance and in response, sends the object to the network appliance accompanied by an HTTP 200 OK message 714. The network appliance receives HTTP 200 OK message 714 from the server device, and at 716 identifies the object as a cacheable object based on the contents of HTTP 200 OK message 714. For example, HTTP 200 OK message 714 includes "cache-control" information indicating that the object is a cacheable object. Because the client device has requested a cacheable object, the network appliance continues to deliver network resources that reference this object without modifying the reference. However, as previously described, the network resource may alternatively rewrite references to cacheable objects in a consistent manner each time the network resource is requested in order to avoid breaking the cache on the client-side.

The network appliance sends the initially requested object to the client device accompanied by an HTTP 200 OK message 718. HTTP 200 OK message 718 is identical to HTTP 200 OK message 714 in this particular example. However, as previously described, the network appliance may alternatively redirect the client device to another network location from which the object may be requested in a consistent manner each time the object is requested in order to avoid breaking the cache on the client-side. The client device receives the object and HTTP 200 OK message 718. The object may be cached by the client device in accordance with the cache control information of HTTP 200 OK message 718.

Figure 8:
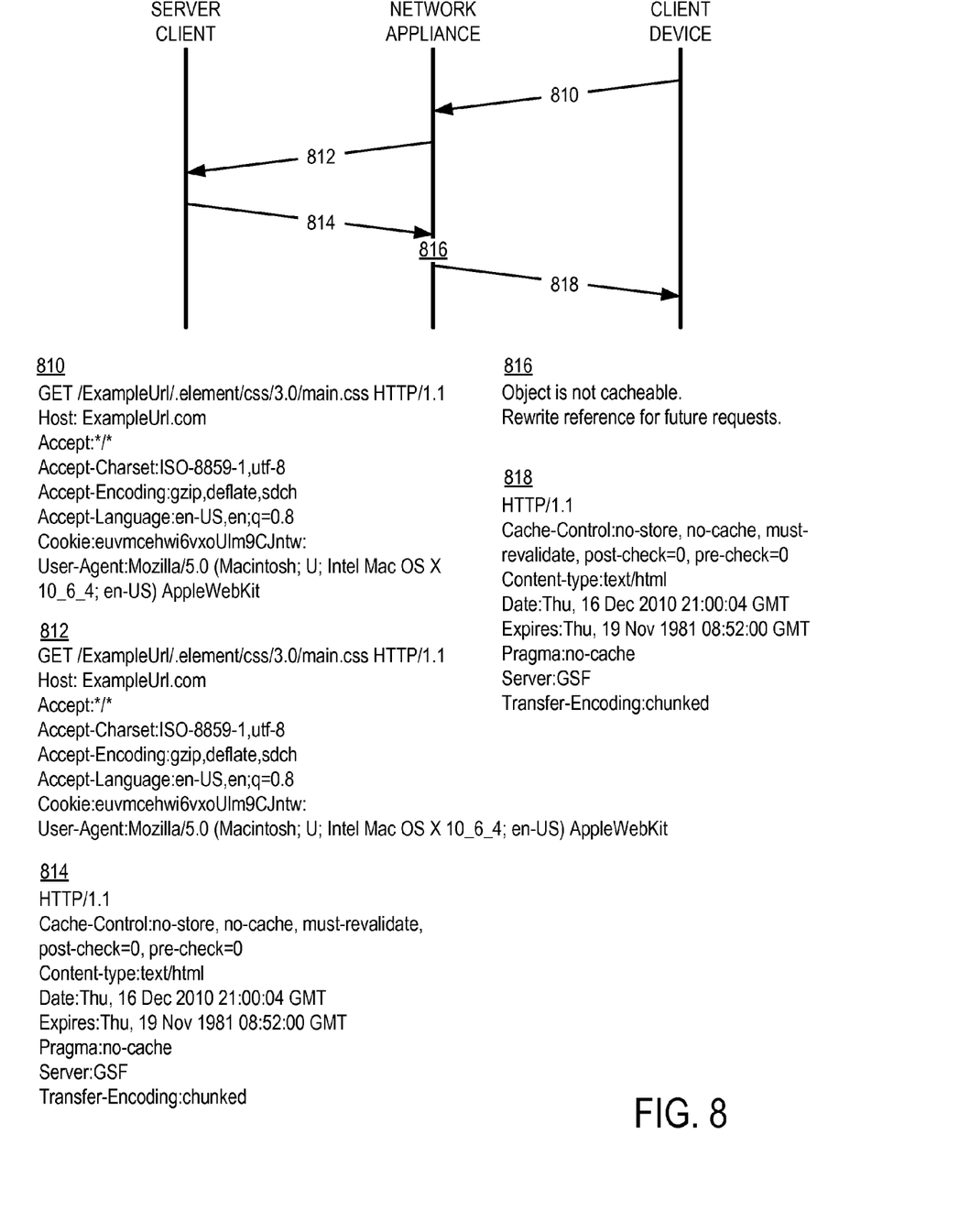
FIG. 8 is a network flow diagram depicting an example response to an initial client request for a non-cacheable object according to one disclosed embodiment.

FIG. 8 depicts an example network flow diagram according to a disclosed embodiment in which a network appliance receives an initial request for an object referenced in a network resource that is identified as a non-cacheable object. In FIG. 8, a client device sends an HTTP GET message 810 for the object by traversing the network location referenced in the network resource. The network appliance receives HTTP GET message 810 sent by the client device and in response, sends an HTTP GET message 812 to a server device. The server device receives HTTP GET message 812 from the network appliance and in response, sends the network resource as an HTTP 200 OK message 814 accompanying the object to the network appliance.

The network appliance receives HTTP 200 OK message 814 from the server device. The network appliance identifies the object as a non-cacheable object at 816 based on cache control information of HTTP 200 OK message 814. Because the object has been identified as a non-cacheable object, the network resource may rewrite the network resource that referenced the non-cacheable object in response to subsequent requests for the network resource by the client device. The network resource may send the object to the client device accompanied by HTTP 200 OK message 818. Alternatively, the network appliance may redirect the client device to a network location where the object may be retrieved, even in response to an initial request for the object, since the object has been identified as a non-cacheable object. For example, the network resource may redirect the client device to an IP address instead of the original host name.

Figure 9:
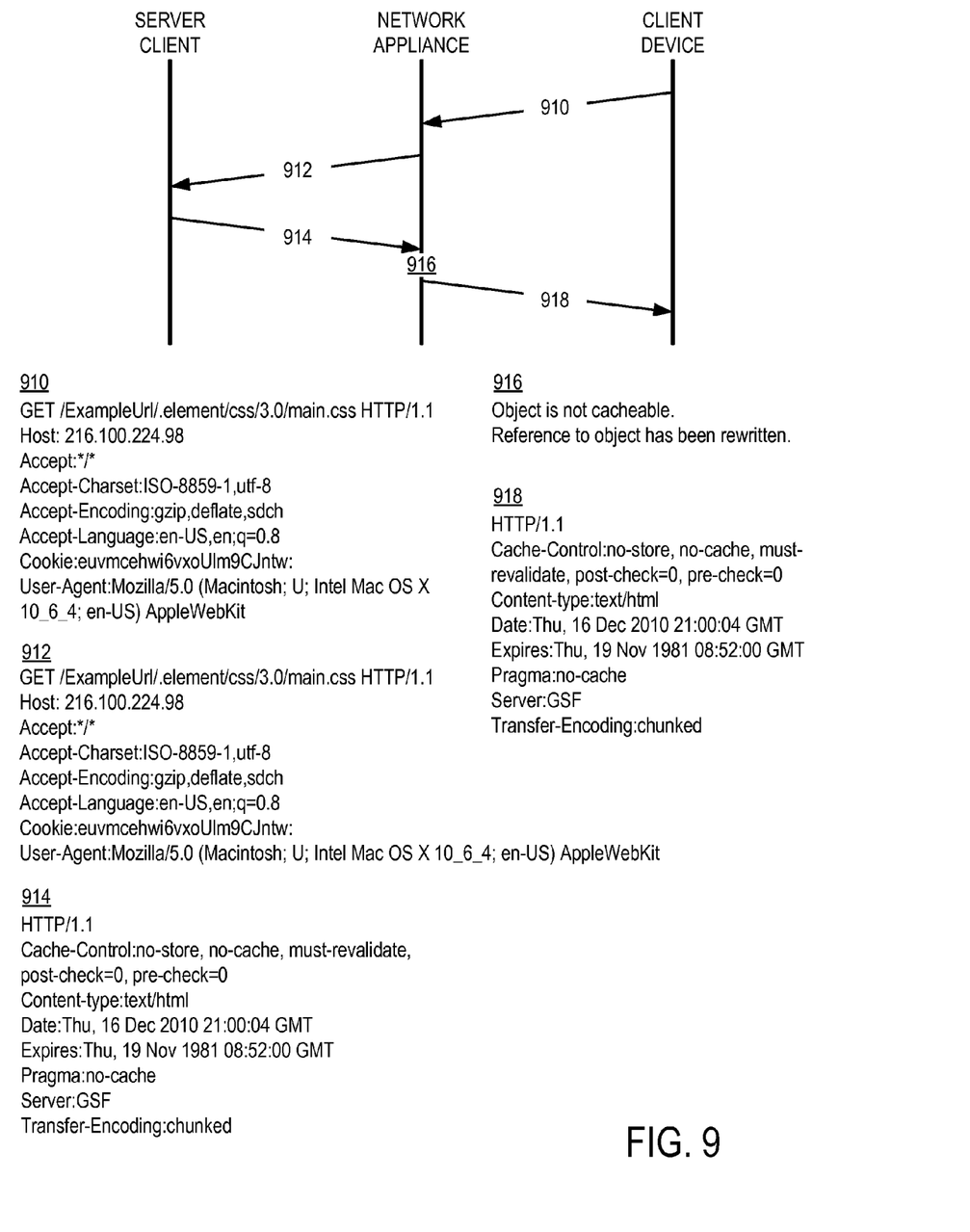
FIG. 9 is a network flow diagram depicting an example response to a subsequent client request for a non-cacheable object according to one disclosed embodiment.

FIG. 9 depicts an example network flow diagram according to a disclosed embodiment in which a network appliance receives a subsequent request for a non-cacheable object referenced in a network resource, such as after receiving and responding to the request for the non-cacheable object of FIG. 8, for example. In FIG. 9, a client device sends an HTTP GET message 910 for the non-cacheable object to the network appliance. In this example, HTTP GET message 910 includes reference to IP address "216.100.224.98" that was rewritten from host name "ExampleUrl.com". The non-cacheable object of the rewritten network resource in this example may correspond to previously described reference 620 of FIG. 6 that has been rewritten from reference 520 of FIG. 5. The reference to the object in the network resource may be rewritten by the network appliance to include the IP address instead of original host name to avoid subsequent browser DNS lookup by the client device.

The network appliance receives HTTP GET message 910 sent by the client device and in response, sends an HTTP GET message 912 to a server device. The server device receives HTTP GET message 912 from the network appliance and in response, sends the network resource to the network appliance accompanied by an HTTP 200 OK message 914. The network appliance receives HTTP 200 OK message 914 from the server device, and identifies the network resource as a non-cacheable object at 916. Because the client's request for the network resource is a subsequent request for the object, the reference to the object in the network resource has been rewritten. The network appliance sends the initially requested network resource to the client device accompanied by HTTP 200 OK message 918. The client device receives HTTP 200 OK message 918 accompanying the object. Alternatively, the network resource may redirect the client device to another network location from which the non-cacheable object may be requested.

Accordingly, a difference between cacheable and non-cacheable objects (in at least some implementations) is that the network appliance may rewrite a reference in a network resource to a non-cacheable object to different network locations for subsequent requests made by the client device for the network resource, or may redirect the client device to different network locations for subsequent requests for the object. In contrast, references to cacheable objects may be maintained or rewritten to the same network location each and every time, or the client device may be redirected to the same network location each and every time to enable the browser program of the client device to maintain proper caching of the object.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for network communications among a network appliance connectable to one or more client devices via a wide area network and one or more server devices via a local area network, the method comprising, at the network appliance:
   receiving, from a client device of the one or more client devices via the wide area network, a request for a network resource having a plurality of references to respective objects;
   retrieving the network resource from the one or more server devices via the local area network;
   identifying based, at least in part, on cache control header information or object type information of each object referenced in the network resource whether that object is a cacheable object;
   selectively modifying the network resource by rewriting references for non-cacheable objects identified from the cache control header information or object type information of the plurality of references, to specify one or more different references to the non-cacheable objects to increase a number of concurrent Transmission Control Protocol (TCP) connections to the network appliance that are opened by a browser program of the client device relative to a number of concurrent TCP connections that would have otherwise been opened by the browser program had the network resource not been modified;
   if one or more non-cacheable objects have been identified, sending the modified network resource to the client device via the wide area network; and
   if only cacheable objects have been identified, sending the network resource to the client device via the wide area network without modifying the references.

2. The method of claim 1, wherein modifying the network resource comprises:
   parsing the network resource retrieved from the one or more server devices to identify the plurality of references to the respective objects; and
   wherein the one or more different references refer to one or more different network locations including: one or more different Internet Protocol (IP) addresses, one or more different host names, and/or one or more different ports;
   wherein at least some of the increased number of concurrent TCP connections are opened to the one or more different network locations referred to by the one or more different references.

3. The method of claim 2, further comprising:
   receiving a plurality requests for the objects from the client device via the wide area network over the increased number of concurrent TCP connections if one or more non-cacheable objects have been identified; and
   replying to the plurality of requests for the objects by sending the objects to the client device via the wide area network over the increased number of concurrent TCP connections.

4. The method of claim 2, further comprising:
   in response to receiving the request for the network resource from the client device, determining that network address space is referenced in at least some of the plurality of references not currently being served by the network appliance; and
   establishing virtual address space in order to receive and respond to subsequent requests traversing at least some of the plurality of references.

5. The method of claim 4, wherein establishing virtual address space further comprises:
   dynamically generating the virtual address space in response to receiving the request for the network resource from the client device; or
   referencing a pre-defined list of virtual network addresses to identify the virtual address space.

6. The method of claim 1, wherein the increased number of concurrent TCP connections includes seven (7) or more TCP connections.

7. The method of claim 1, wherein modifying the network resource comprises:
   modifying the network resource in response to exceeding a threshold condition with respect to a connection performance parameter of one or more pre-existing TCP connections with the client device over the wide area network;
   wherein the connection performance parameter includes one or more of a round trip time, packet loss, TCP receive window, or congestion window.

8. The method of claim 1, wherein modifying the network resource comprises:
   modifying the network resource further in response to a number of the plurality of references in the network resource exceeding the browser program imposed limit on the number of concurrent TCP connections; or
   modifying the network resource further based, at least in part, on the number of the plurality of references in the network resource.

9. A network appliance connected or connectable to one or more client devices via a wide area network and one or more server devices via a local area network, the network appliance comprising:
   one or more processors; and
   mass storage including a routing program executable by the one or more processors to:
      receive an initial request for a network resource from a client device of the one or more client devices via the wide area network;
      retrieve the network resource from a server device of the one or more server devices via the local area network, the network resource having a plurality of references to respective objects;
      identify based, at least in part, on cache control header information or object type information of each object referenced in the network resource whether that object is a cacheable object;
      send the network resource to the client device via the wide area network;

receive, from the client device via the wide area network, a plurality of initial requests for the objects referenced in the network resource by the plurality of references;

in response to receiving the plurality of initial requests from the client device, send one or more redirect messages to the client device via the wide area network to cause the client device to issue one or more subsequent requests for one or more of the objects via the wide area network over one or more different Transmission Control Protocol (TCP) connections than one or more initial TCP connections by which the plurality of initial requests were received;

receive one or more subsequent requests for the one or more objects from the client device via the wide area network over the one or more different TCP connections; and reply to the subsequent requests for the one or more objects by sending the one or more objects to the client device via the wide area network over the one or more different TCP connections.

10. The network appliance of claim 9, wherein the one or more redirect messages indicate respective network locations to be used by the client device with which to establish the one or more different TCP connections.

11. The network appliance of claim 10, wherein at least some of the one or more different TCP connections are one or more pre-existing TCP connections between the client device and network appliance.

12. The network appliance of claim 9, wherein the routing program is further executable by the one or more processors to:

if the object is a cacheable object, then generate the redirect message to refer to a previous network location from which the client device previously requested and received the object; and if the object is a non-cacheable object, then generate the redirect message to refer to an Internet Protocol (IP) address of a different network location than the previous network location to cause a browser program of the client device to retrieve the object from the IP address via a different TCP connection of the one or more different TCP connections without performing a Domain Name System (DNS) lookup for the IP address of the different network location.

13. The network appliance of claim 9, wherein the routing program is further executable by the one or more processors to:

parse the network resource retrieved from the one or more server devices to identify the plurality of references to the objects; and generate the redirect message for one or more of the plurality of references to specify one or more different references to the one or more of the objects to cause the client device to open an increased number of concurrent TCP connections to the network appliance via the wide area network than otherwise would have been opened had the one or more redirect messages not been sent to the client device due to a browser program imposed limit on a number of concurrent TCP connections;

wherein one or more of the increased number of concurrent TCP connections are opened to the one or more different network locations referred to by the one or more different references.

14. The network appliance of claim 13, wherein the one or more different references refer to one or more different network locations including: one or more different IP addresses, one or more different host names, and/or one or more different ports.

15. The network appliance of claim 9, wherein the routing program is further executable by the one or more processors to:

in response to receiving the request for the network resource from the client device, determine that network address space is referenced in at least some of the plurality of references not currently being served by the network appliance; and establish virtual address space in order to receive and respond to the one or more subsequent requests traversing each of the at least some of the plurality of references;

wherein the virtual address space is established by:

dynamically generating the virtual address space in response to receiving the request for the network resource from the client device; or referencing a pre-defined list of virtual network addresses to identify the virtual address space.

16. The network appliance of claim 9, wherein a redirect message of the one or more redirect messages is sent to the client device based, at least in part, on an object type of an object requested by the client device.

17. The network appliance of claim 9, wherein the routing program is further executable by the one or more processors to:

send the one or more redirect messages to the client device in response to exceeding a threshold condition with respect to a connection performance parameter of one or more pre-existing TCP connections with the client device over the wide area network.

18. The network appliance of claim 17, wherein the connection performance parameter includes one or more of a round trip time, packet loss, TCP receive window, or congestion window.

19. A network appliance connected or connectable to one or more client devices via a wide area network and one or more server devices via a local area network, the network appliance comprising:

one or more processors; and mass storage including a routing program executable by the one or more processors to:

receive, from the client device of the one or more client devices via the wide area network, a request for a network resource having a plurality of references to respective objects;

retrieve the network resource from the server device via the local area network;

identify based, at least in part, on cache control header information or object type information of an object referenced by an initial reference in the network resource whether the object is a cacheable object;

if the object is a cacheable object, rewrite the initial reference to the object in the network resource to a first different reference to enable a browser program of the client device to properly cache the object in a browser side cache and retrieve the object from the browser side cache during a current browsing session or a subsequent browsing session;

if the object is a non-cacheable object, then rewrite the initial reference to the object in the network resource indicating a host name of the object to a second different reference indicating an Internet Protocol (IP) address to the object; and send one of the initial reference, the first different reference, or the second different reference to the client device via the wide area network.

20. The network appliance of claim 19, wherein the routing program is further executable by the one or more processors to:
 receive, from the client device via the wide area network, a request for the object at the first different reference or the second different reference sent to the client device; and
 reply to the request for the object by sending the object to the client device via the wide area network.

* * * * *